United States Patent
Mueller et al.

(10) Patent No.: US 8,521,420 B2
(45) Date of Patent: Aug. 27, 2013

(54) METHOD FOR ROUTE DETERMINATION AND DEVICE FOR IT

(75) Inventors: Guido Mueller, Quedlinburg (DE); Michael Laedke, Hildesheim (DE); Guido Stuebner, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 12/734,884

(22) PCT Filed: Oct. 1, 2008

(86) PCT No.: PCT/EP2008/063126
§ 371 (c)(1),
(2), (4) Date: Oct. 15, 2010

(87) PCT Pub. No.: WO2009/068352
PCT Pub. Date: Jun. 4, 2009

(65) Prior Publication Data
US 2011/0029231 A1      Feb. 3, 2011

(30) Foreign Application Priority Data
Nov. 30, 2007   (DE) .......................... 10 2007 057 715

(51) Int. Cl.
*G01C 21/00*   (2006.01)
(52) U.S. Cl.
USPC ............ 701/411; 701/400; 701/408; 701/410
(58) Field of Classification Search
USPC ................................... 701/117, 400, 408–411
See application file for complete search history.

(56) References Cited

U.S. PATENT DOCUMENTS

| | | | |
|---|---|---|---|
| 6,427,114 B1 * | 7/2002 | Olsson | 701/117 |
| 2008/0033636 A1 * | 2/2008 | Ryu et al. | 701/201 |
| 2008/0086455 A1 * | 4/2008 | Meisels et al. | 707/3 |
| 2008/0208452 A1 * | 8/2008 | Stocker | 701/201 |
| 2008/0221783 A1 * | 9/2008 | Boss et al. | 701/117 |

FOREIGN PATENT DOCUMENTS

| | | |
|---|---|---|
| CN | 1344909 | 4/2002 |
| DE | 40 08 460 | 9/1991 |
| EP | 0 703 433 | 3/1996 |
| EP | 1 191 307 | 3/2002 |
| EP | 1 491 859 | 12/2004 |

OTHER PUBLICATIONS

Patent Abstracts of Japan Publication No. 07-083685, Mar. 28, 1995.

* cited by examiner

*Primary Examiner* — Hussein A. Elchanti
(74) *Attorney, Agent, or Firm* — Kenyon & Kenyon LLP

(57) ABSTRACT

A method is provided for determining a route for a route guidance, in which a first route is determined on the assumption of a first traffic situation, a second route is determined on the assumption of a second traffic situation, the second route being compared to the first route, and a route change difference being determined from the comparison, where the two routes are offered to a user for the selection for an additional route guidance only if the route change difference exceeds a first threshold value. A device for carrying out the method is also described.

16 Claims, 2 Drawing Sheets

ND FOR ROUTE DETERMINATION AND DEVICE FOR IT

METHOD FOR ROUTE DETERMINATION AND DEVICE FOR IT

FIELD OF THE INVENTION

The present invention is based on a device and a related method.

BACKGROUND INFORMATION

It is understood that there are vehicle navigation system which guide the driver of a vehicle from a current position to a destination along a calculated route, using displayed or verbal navigation instructions. The route calculation takes place regularly, in this instance, for the purpose of optimizing the route with respect to at least one optimization criterion, such as the fastest or the shortest route.

A navigation system for a land vehicle is discussed in DE 40 08 460 A1, which receives and continuously evaluates traffic messages, and calculates a first travel route without taking into account traffic messages and calculates a second traffic route while taking into account the traffic messages received. If a comparison of the first and the second route shows that the second route is probably faster than the first route, the second route is supplied as route information to an output device of the navigation system, and the driver of the land vehicle is guided to the destination on the second route.

In this procedure, which is also designated as automatic dynamization below, at each change in the traffic position an alternative route is calculated, and the additional route guidance takes place automatically, based on the new route.

A navigation system is known from Patent Abstracts of Japan, Publication Number 07-083685, in which, in addition, the second route is output as an alternative route to the first route, and the selection between the first and the second route is left to the driver.

In this version, designated also as manual dynamization below, the driver is informed on each change in the traffic situation and actively has to decide for the old or the new traffic situation and the route resulting from this. In some systems, he can also do this in the light of the routes themselves.

The two forms of the dynamization described have both specific advantages and also have disadvantages.

As one decisive advantage of automatic dynamization one might point out that the driver is not distracted unnecessarily by the navigation system, and is able to concentrate fully and completely on the road traffic. The disadvantage is that the driver is hardly able to exert personal influence. The alternative route is thus used even when it brings with it no significant route advantage compared to the old route, or the traffic message source (e.g. RDS-TMC, TMCPro or XM-TMC) is graded as being less reliable.

In manual dynamization, there is an advantage to the driver, because of the possibility of actively exerting an influence by using the old or the alternative route for the further route guidance, depending on the subjective estimation of the route change. The disadvantage is that, for each change in the traffic message position, the vehicle's driver is drawn actively into the route selection, and is thereby diverted from his real task, the active participation in the road traffic.

Consequently, the advantage of the one method is the disadvantage of the other method. On the one hand, both advantages are very agreeable to the user, but on the other hand, the two disadvantages are definitely problematic.

A variant of manual dynamization is discussed in EP 0 838 797 B1, which eases the selection of the route by the user to the extent that route guidance instructions are offered to him, and one of the two routes is selected by following one of the route guidance instructions, that is, by conclusory action.

SUMMARY OF THE INVENTION

The exemplary embodiments and/or exemplary methods of the present invention having the features described herein has the advantage of combining the advantages of the two procedures named above, that is, automatic and manual dynamization, and, at the same time, of avoiding the disadvantages of the two methods.

To do this, in a method for determining a route for route guidance, a first route is determined under the assumption of a first traffic situation, a second route is determined under the assumption of a second traffic situation, the second route is compared to the first route, and from the comparison, a route change difference is determined, and the two routes are only offered to a user, for selection for further route guidance, if the route change difference exceeds a first threshold value. This achieves that the user is only bothered with a route selection if a substantial route change, especially a deterioration of the route, such as a considerable detour, comes about as a result of a changed traffic situation, because of what is then the most favorable route, compared to the original route.

One of the two routes is advantageously determined automatically, for the subsequent route guidance, if the route change difference does not exceed the first threshold value. This achieves that the user is not bothered with the route selection in response to a slight route change difference, and thereby a slight route change.

In the case of a route change difference smaller than zero, that is, when an improvement in the route, such as a shorter route, comes about, perhaps as a result of a loosening up of the traffic situation or the like, the second route is advantageously selected automatically, which means that an automatic dynamization takes place without user interaction.

A driving time advantage is advantageously determined from a comparison of the effects of following the second route to those of following the first route, in each case under the assumption of the second traffic situation, And the second route is automatically picked if the route advantage exceeds a second threshold value, and the route change difference does not exceed the first threshold value.

A route advantage is advantageously determined from a comparison of the effects of following the second route to those of following the first route, in each case on the assumption of the second traffic situation, and the first route is automatically picked if the route change difference does not exceed the first threshold value and does not fall below a third threshold value, and the route advantage does not exceed the second threshold value. This third threshold value may be smaller than, or equal to zero.

To support the user during his selection of one of the routes offered him for selection, the effect connected with the alternative route, that is, especially the route change difference, and may also include the route advantage, in this case particularly the driving time advantage, of the second, compared to the first route is output advantageously. Alternatively or in addition, it may also be provided in this instance that the appropriate, route-relevant parameters are output, that is, especially the parameter on whose basis the route change difference was determined, such as the travel route, as well as the driving time advantage to the routes offered for selection, for instance.

Advantageously, the threshold value(s), on the basis of which a decision is made on an automatic or a manual dynamization or no dynamization, may be specified manually by the user. In that way, the system response may be adjusted to user-specific preferences, starting from a factory setup. According to one advantageous refinement, the threshold value(s) is/are automatically adjusted by the user response in the operation of the navigation system. To do this, the decisions of the user in cases in which two routes are offered for selection, are statistically evaluated.

Exemplary embodiments of the present invention are depicted in the figure and will be explained in more detail in the following text. The same reference numerals designate the same or similarly acting elements, in this context.

DETAILED DESCRIPTION

Figure 1:
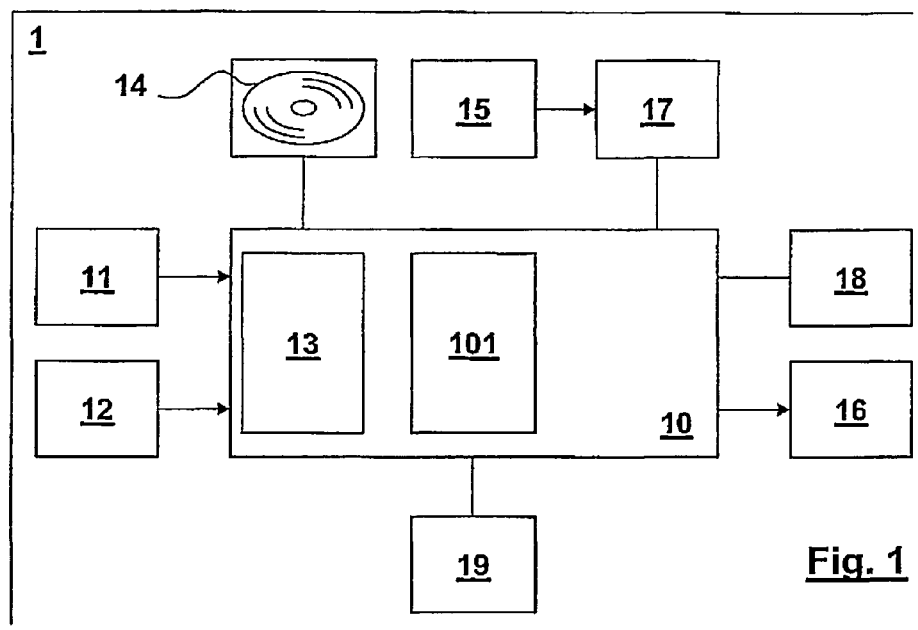
FIG. 1 shows a device for carrying out the method according to the present invention.

In FIG. 1, 1 denotes the device according to the present invention for carrying out the method of the present invention. In the present case, this involves, for example, and without restricting the generality of the present invention, a navigation unit, in this instance particularly for temporary or permanent use in a vehicle.

In a known manner, navigation unit 1 includes an arrangement 11 for self-location, and thus for determining a current vehicle location, for instance, a receiver for GPS satellite location signals, which may also include inertial sensors and more of the like, the respectively current location being determined by a linkage of these signals. A driving destination may be input by the driver via an operating device 12, which may have operating elements available. As a result, route calculation module 13, which may be a software module that is processed by a computer of a central control 10 of navigation system 1, calculates a route from the current vehicle location to an input driving destination via a traffic route network, which is represented by map data 14 stored in a mass storage unit 14. This route is stored in a route memory 18.

In this route calculation, information on traffic disruptions is taken into account which, for example, has been broadcast by radio as TMC-(Traffic Message Channel) traffic messages and received by radio receiver 15. The taking into account of the traffic messages, or more exactly, the events relevant to traffic that is included in them, which may take place by an event-dependent and extent-dependent adjustment of the weights assigned to the elements of the traffic route network, such as transit times, speed values and the like. The calculated route becomes the basis for the subsequent route guidance, in the course of the movement of the vehicle, its current location being determined and calibrated with the course of the route, and as needed, route guidance instructions for following the route are generated and output acoustically, for example, as synthesized speech via an output device 16.

In this navigation unit 1, a recalculation of the route is initiated in response to a change in the traffic situation. By traffic situation one would understand, in this context, the entirety of traffic messages that may be stored in a memory 17 of the navigation unit. These traffic messages may particularly have been received via radio as so-called TMC traffic messages according to ISO 14819, for example. A change in the traffic situation comes about, in this instance, in that additional traffic messages are received by radio receiver 15 or in another way, which are not yet present in memory 17, or messages on the stopping or letting up of traffic disturbances are received that were present, so-called cancel messages (which in the following descriptions also include the letting up of existing traffic disturbances), or certain traffic messages present in memory 17 are no longer being received. By traffic situation there is thus understood, in this case, the quantity of the traffic disturbance messages present in the navigation unit, which may differ from an actual traffic situation, since traffic messages are not always at the most up-to-date state, or partially have not yet been received by radio receiver 15, or for similar reasons.

Figure 2:
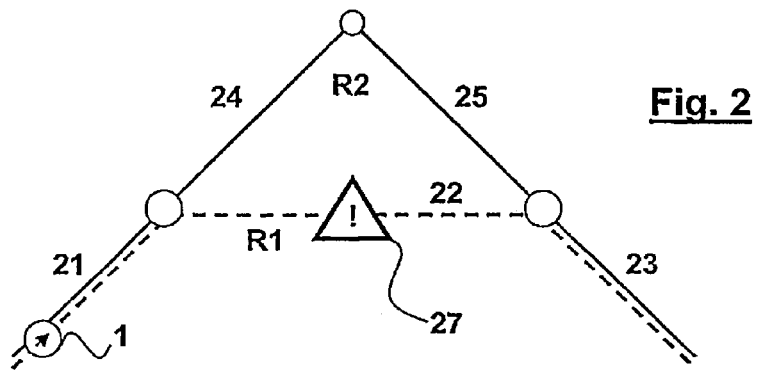
FIG. 2 shows a cutout from a traffic path network.

In FIG. 2, 1 designates the vehicle's navigation unit and the position of the vehicle in which the navigation unit is being operated. Based on a first traffic situation, a first route R1 has been calculated, which runs via route sections 21, 22 and 23. After the calculation of this route, a new traffic message was received which designates a disturbance 27 on the route section, for instance, a traffic jam or another event impairing the traffic flow. As a result of receiving this new traffic message and the new, second traffic situation it goes along with, a new, second route R2 is calculated.

Figure 3:
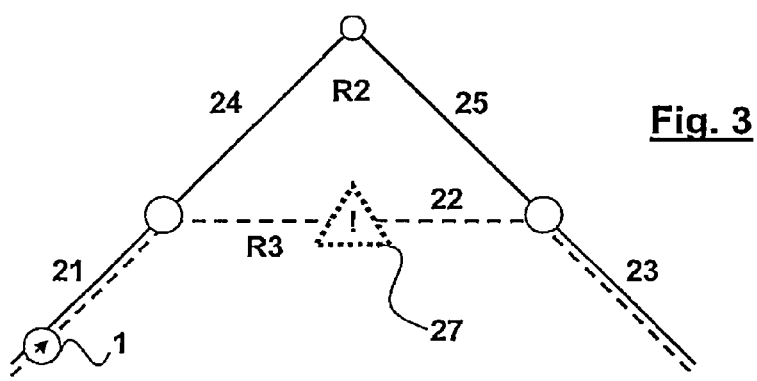
FIG. 3 shows an additional cutout from a traffic path network.

A situation that is changed, as opposed to that, is shown in FIG. 3. Reference numeral 1 again designates the vehicle's navigation unit and the position of the vehicle in which the navigation unit is being operated. The currently valid route is that which was calculated, based on the changed traffic situation according to FIG. 2, that is second route R2. In the further course of time, there comes about again a new traffic situation because traffic disturbance 27 drops out, which may be imparted, for example, by a cancel message received by radio receiver 15. The cancel message has the result that the resistance of route section 22 is reduced to its original value again. In reaction to the new traffic situation, a new route calculation is now triggered again, which yields third route R3, corresponding to first route R1, as the optimal route. That is, a changed traffic situation may come about both by the occurrence of new, additional traffic disturbances and by the dropping out of traffic disturbances that existed up to now.

Control 10 of the navigation unit includes a valuation module 101 for valuing the differences between original route R1 and alternative route R2.

Based on the values of old R1 and new route R2, a route change difference TDV is determined and a route advantage may also be determined in addition, particularly a driving time advantage TTA.

Route change difference TDV describes the difference between the old, first route R1, which was calculated based on the first traffic situation, that is, before the change in the traffic situation, and alternative second route R2 which was determined taking into consideration the changed, second traffic situation (FIG. 2). Consequently, it is a measure for the effect of the route itself by taking into consideration the new traffic situation. The abstract resistance (opposition) is valued corresponding to the optimization criterion used, such as fastest route or, alternatively, shortest, optimal, least-fuel-consumption route, or the like. The route change difference may assume positive values, which corresponds to a deterioration of the route with respect to the criterion observed, that is, for example, a longer driving route of new route 2 as compared to old route R1 (FIG. 2). However, the route change difference may also assume negative values, which corresponds to a positive effect, that is, for example, a shorter driving route of new route R3 compared to old route R2 (FIG. 3).

Route advantage TTA, by contrast, in the case of the driving time advantage, describes the advantage in time of new alternative route 2 compared to old route 1, in both cases the new, second traffic situation being used as the basis. Consequently, it is a measure for the relevance of alternative route R2 compared to original route R1. In this context, in response to new traffic messages, the driving time advantage can only be greater or equal to zero, since the possible alternative route in the case of a dynamization always has to be equal to, or better than the original having the traffic disturbance, for otherwise no alternative route is determined.

A more accurate analysis of the reasons for the advantageous and disadvantageous properties points out the way for a method that unifies the advantages and removes the disadvantages of the method.

Figure 4:
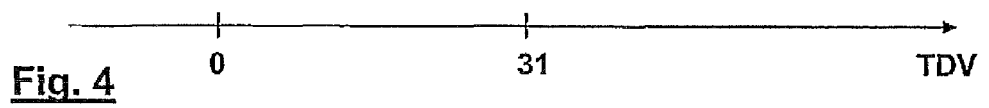
FIG. 4 shows a first motor vehicle.
Figure 6:
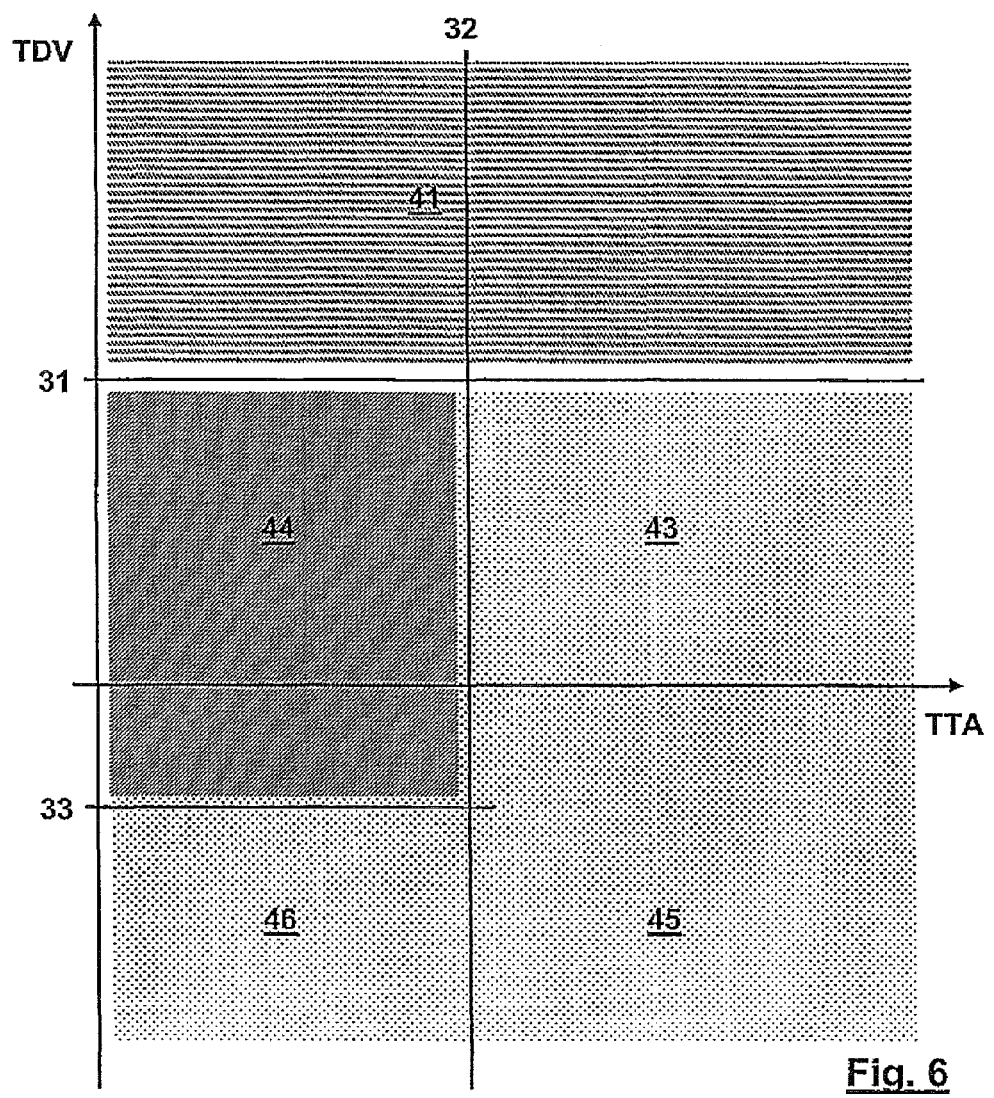
FIG. 6 shows a third diagram.

In the case of "manual dynamization", that is known per se, and was described above, when there is a high rate of change of the traffic messages situation, that is, frequent changes in the traffic situation, the frequent inquiries with respect to the selection of the appropriate route will often act in a disturbing manner. These inquiries are of great interest, however, if the alternative route becomes a great deal worse compared to the original, that is if the route change difference is greater than a first threshold value 31 (FIGS. 4 and 6). In route improvements, for instance, based on cancel messages or the cancellation of traffic messages, that is, a route change difference less than zero or alternatively less than a third threshold value 33, which is less than zero, no inquiry with respect to the dynamization should be carried out.

Figure 5:
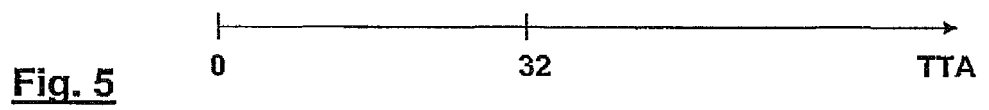
FIG. 5 shows a second diagram.

In some cases, the alternative route calculated represents only a very slight, and hardly significant advantage compared to the old route, the route advantage is very small, that is, less than a second threshold value 32 (FIGS. 5 and 6). For example, the driver has to leave the express highway or a federal road, and is guided around the disturbance via country roads and local roads. This form of the alternative for a very small driving time advantage TTA is usually not understood or accepted. In this case, a dynamization should not take place, and a user inquiry is not desirable either.

The two aspects named above are independent of each other, and, as shown in FIG. 6, may be brought into reference. Route improvements, that is, TDV less than zero, are only able to occur in response to canceled traffic messages. Depending upon the criterion observed, such as "optimal route", which represents a combination of shortest and fastest route, the special situation may come about that the driving time advantage, and the driving time proportion of the resistance of the route change difference, are equal in absolute value. Therefore, in this case, even in response to a small route change difference TDV less than first threshold value 31, and greater than third threshold value 33, no dynamization should take place in the case of cancel messages.

According to the exemplary embodiments and/or exemplary methods of the present invention, a user inquiry still takes place only when the selection of second route R2 compared to first route R1 would mean a considerable route deterioration, that is, TDV is greater than first threshold value 31 (area 41 in FIG. 6). In the advantageous exemplary embodiment of the present invention described here, one of the two routes R1 or R2 is further selected automatically if the route change difference does not exceed first threshold value 31. Since the user is no longer being queried in response to every little thing, he is consequently distracted less from the traffic situation, but is basically able to maintain the possibility of exerting influence in case of serious changes.

Thus, to sum up, first route R1 and second route R2 should only be offered to the user for selection if route change difference TDV exceeds first threshold value 31 (manual dynamization, that is, only after user interaction), otherwise one of the two routes is automatically selected if route change difference TDV does not exceed first threshold value 31.

Furthermore, it may be provided that the route advantage, in this case particularly in the form of a driving time advantage TTA, is also taken into account. Second threshold value 32 defines a minimum driving time advantage, as of which an automatic dynamization is supposed to take place. Therefore, in cases in which the route change difference TDV does not exceed first threshold value 31, then, if a) driving time advantage TTA exceeds second threshold value 32, second route R2 is automatically selected (automatic dynamization, that is, without user interaction)

b) driving time advantage TTA does not exceed threshold value 32, but route change difference TDV does not fall below threshold value 33, according to the advantageous specific embodiment described here, first route R1 is automatically selected (no dynamization) and c) driving time advantage TTA does not exceed threshold value 32, but route change difference TDV is less than zero or, alternatively, it falls below third threshold value 33, according to the advantageous specific embodiment described here, second route R2 is automatically selected (automatic dynamization).

Even in the case of a small route advantage TTA, but a large route change TDV, in this instance the manual dynamization of the complete suppression of dynamization may be used, with the thought in mind that traffic messages are possibly not one hundred percent reliable, or their effects on the traffic flow, and with that the driving time, are possibly not exactly predictable. In this case, the possibility is given to the user to make a decision for the one or the other route, judging from his possible wealth of experience of the respective routes or from other preferences, such as detouring major expressway construction locations known to him on one of the routes, or the like.

Based on the route situation shown in FIG. 2, the following example may be illustrated, the route change difference being observed on the basis of the route and the route advantage and on the basis of the travel time.

|  | old route (R1) | | new route (R2) | | |
| --- | --- | --- | --- | --- | --- |
|  | old traffic situation | new traffic situation | new traffic situation | TTA | TDV |
| driving time [h] | 01:00 | 01:15 | 01:10 | 00:05 |  |
| route [km] | 60 | 60 | 70 |  | +10 |

Depending on the threshold values used, the responses may be different. As long as the loss in the form of route change difference is below threshold value 31 ($TDV_{threshold}$), no inquiry takes place with respect to the dynamization, which is the case with the following threshold: $TDV_{threshold}=+20$. If, however, the threshold value is so small that the route change difference is greater, e.g. $TDV_{threshold}=+5$, and inquiry takes place with the user with respect to the use of old route R1 or new route R2.

In case the loss in form of route change difference TDV does not exceed threshold value 31, a direct dynamization takes place only if the driving time advantage TTA is more than the minimum driving time advantage $TTA_{threshold}$ set. In the example shown, a direct dynamization takes place only if a value less than or equal to 0:05 was entered as threshold value $TTA_{threshold}$.

For the cancellation of the traffic disturbance, the following picture comes about.

|  | old route (R2) | | new route (R3) | | |
| --- | --- | --- | --- | --- | --- |
|  | old traffic situation | new traffic situation | new traffic situation | TTA | TDV |
| driving time [h] | 01:10 | 01:10 | 01:00 | 00:10 | |
| route [km] | 70 | 70 | 60 | | −10 |

Based on the improvement in the route, in each case no inquiry takes place at the user about dynamization, but rather the decision takes place in the light of the driving time advantage. The dynamization is carried out or not, depending on the proportion of the driving time and the driving time advantage threshold.

According to one advantageous refinement of the present invention, the threshold values that lead to a user interaction are automatically adapted to the user behavior. In this case, the navigation system "learns" the new threshold values automatically. To do this, the tendency to refusing or confirming in the user-confirmed dynamization is brought into relationship with respect to the threshold value.

For selection by the user, the two routes R1 and R2 or R2 and R3 that are to be selected may advantageously be shown on display 19 of navigation unit 1, which may be drawn into a map representation. In particular, in this context, the traffic disturbance messages present that relate to the two routes R1 and R2, in the case of FIG. 2 the message referring to disturbance 27, may also be drawn into the map representation. The route selection may then take place by operating an operating element of operating device 12.

Alternatively, it may also be provided that, as is known from EP 0 838 797 B1, alternative route guidance instructions for both routes R1 and R2 be output with the instruction as to which of the routes continues to be traveled by following which instruction, that is, approximately in the form "For the selection of the current route, continue straight ahead and continue to follow A6. For the selection of an alternative route, that has been newly calculated based on new traffic messages, turn off at the next connecting location to A5, in the direction of Karlsruhe, and follow A5", one of the routes then being selected by continuing to drive on corresponding to one of the instructions to one of the routes.

What is claimed is:

1. A method for determining a route for a route guidance in a navigation system apparatus, the method comprising:
   determining a first route based on an assumed first traffic situation;
   determining a second route based on an assumed second traffic situation;
   comparing the second route to the first route;
   determining a route change difference from the comparing; and
   offering the first route and the second route to a user for selecting an additional route guidance only if the route change difference exceeds a first threshold value.

2. The method of claim 1, wherein if the route change difference does not exceed the first threshold value, one of the first route and the second route is determined automatically for the subsequent route guidance.

3. The method of claim 1, wherein the second route is automatically determined if the route change difference is less than zero.

4. The method of claim 1, wherein a route advantage, which is a driving time advantage, is determined from a comparison of the effects of following the second route to those of following the first route, in each case on the assumption of the second traffic situation, and wherein the second route is automatically determined if the route advantage exceeds a second threshold value and the route change difference does not exceed the first threshold value.

5. The method of claim 1, wherein a route advantage is determined from a comparison of the effects of following the second route to those of following the first route, in each case on the assumption of the second traffic situation, and wherein the first route is automatically selected if the route change difference does not exceed the first threshold value and does not fall below a third threshold value, and the route advantage does not exceed a second threshold value.

6. The method of claim 5, wherein the third threshold value is equal to zero.

7. The method of claim 5, wherein the route change difference and the route advantage are output for the support of the user in selecting one of the offered routes.

8. The method of claim 5, wherein the first threshold value and the additional threshold values are specifiable by the user.

9. The method of claim 5, wherein the first threshold value and the additional threshold values are adapted automatically to a user behavior.

10. The method of claim 1, wherein if the route change difference does not exceed the first threshold value, one of the first route and the second route is determined automatically for the subsequent route guidance, and wherein a route advantage, which is a driving time advantage, is determined from a comparison of the effects of following the second route to those of following the first route, in each case on the assumption of the second traffic situation, and wherein the second route is automatically determined if the route advantage exceeds a second threshold value and the route change difference does not exceed the first threshold value.

11. The method of claim 1, wherein the second route is automatically determined if the route change difference is less than zero, and wherein a route advantage, which is a driving time advantage, is determined from a comparison of the effects of following the second route to those of following the first route, in each case on the assumption of the second traffic situation, and wherein the second route is automatically determined if the route advantage exceeds a second threshold value and the route change difference does not exceed the first threshold value.

12. The method of claim 1, wherein if the route change difference does not exceed the first threshold value, one of the first route and the second route is determined automatically for the subsequent route guidance, and wherein a route advantage, which is a driving time advantage, is determined from a comparison of the effects of following the second route to those of following the first route, in each case on the assumption of the second traffic situation, and wherein the second route is automatically determined if the route advantage exceeds a second threshold value and the route change difference does not exceed the first threshold value.

13. The method of claim 1, wherein the second route is automatically determined if the route change difference is less than zero, and wherein a route advantage, which is a driving time advantage, is determined from a comparison of the effects of following the second route to those of following the first route, in each case on the assumption of the second traffic situation, and wherein the second route is automatically determined if the route advantage exceeds a second threshold value and the route change difference does not exceed the first threshold value.

14. The method of claim 5, wherein the third threshold value is equal to zero, wherein the route change difference and the route advantage are output for the support of the user in selecting one of the offered routes, and wherein the first threshold value and the additional threshold values are specifiable by the user.

15. The method of claim 5, wherein the third threshold value is equal to zero, wherein the route change difference and the route advantage are output for the support of the user in selecting one of the offered routes, and wherein the first threshold value and the additional threshold values are adapted automatically to a user behavior.

16. A navigation system device, including a computer program stored in a non-transitory medium which is executable by a hardware processor, for determining a route for a route guidance, comprising:

a processor arrangement having the hardware processor, including:

a first determining arrangement to determine a first route based on an assumed first traffic situation, and to determine a second route based on an assumed second traffic situation;

a comparing arrangement to compare the second route to the first route;

a second determining arrangement to determine a route change difference from a comparison result of the comparing arrangement;

an output arrangement to offer the first route and the second route to a user for selecting an additional route guidance only if the route change difference exceeds a first threshold value; and a decision arrangement to determine whether the selecting occurs by determining if the route change difference exceeds a first threshold value.

* * * * *

UNITED STATES PATENT AND TRADEMARK OFFICE
CERTIFICATE OF CORRECTION

PATENT NO. : 8,521,420 B2  Page 1 of 1
APPLICATION NO. : 12/734884
DATED : August 27, 2013
INVENTOR(S) : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this
Fifteenth Day of September, 2015

Michelle K. Lee
*Director of the United States Patent and Trademark Office*